(12) United States Patent
Eckelberry

(10) Patent No.: US 6,439,586 B1
(45) Date of Patent: Aug. 27, 2002

(54) SPRING BAND FOR AN AXLE ASSEMBLY

(75) Inventor: Jim Eckelberry, Canton, OH (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/453,353

(22) Filed: Dec. 1, 1999

(51) Int. Cl.$^7$ ................................................ B62D 7/22
(52) U.S. Cl. .................. 280/89.1; 280/89.12; 280/81.6; 280/89.11; 280/124.164
(58) Field of Search .................. 280/124.164, 124.165, 280/124.177, 124.1–179, 81.6, 89, 89.1, 89.11, 89.12, 89.13

(56) References Cited

U.S. PATENT DOCUMENTS

| | | | |
|---|---|---|---|
| 3,640,545 A | * 2/1972 | Citroen | 280/124 |
| 4,588,198 A | * 5/1986 | Kanazawa et al. | 280/90 |
| 4,765,650 A | * 8/1988 | Kameshima et al. | 280/723 |
| 5,054,800 A | * 10/1991 | Christensen et al. | 280/204 |
| 5,074,581 A | * 12/1991 | Matsuoka | 280/695 |
| 5,269,546 A | 12/1993 | Pollock et al. | |
| 5,556,081 A | * 9/1996 | Miura et al. | 267/47 |
| 5,597,049 A | * 1/1997 | Bruehl et al. | 180/400 |
| 6,086,075 A | * 7/2000 | O'Bryan et al. | 280/89.12 |

* cited by examiner

Primary Examiner—Kenneth R. Rice
Assistant Examiner—Christopher Buchanan
(74) Attorney, Agent, or Firm—Carlson, Gaskey & Olds

(57) ABSTRACT

A self-steering auxiliary axle assembly having an elastic member for use as a steering damper is provided. The axle assembly has a frame with an axle supported by the frame in spaced relation therefrom with retracted and highway positions. At least one air spring is arranged between the axle and the frame. The air spring is actuateable between an operative mode for damping the axle in the highway position and a non-operative mode when in the retracted position. The axle has opposing ends with spindle assemblies pivotally supported thereon for permitting rotation of said spindle assemblies relative to said axle. Steering arms extend from the spindle assemblies. A control rod interconnects the steering arms for linking the spindle assemblies together. The elastic member interconnects one of the steering arms and the axle for damping the rotation of the spindle assemblies relative to the axle. The steering damper has opposing connections movable relative to one another with the opposing connections joined by the elastic member.

11 Claims, 2 Drawing Sheets

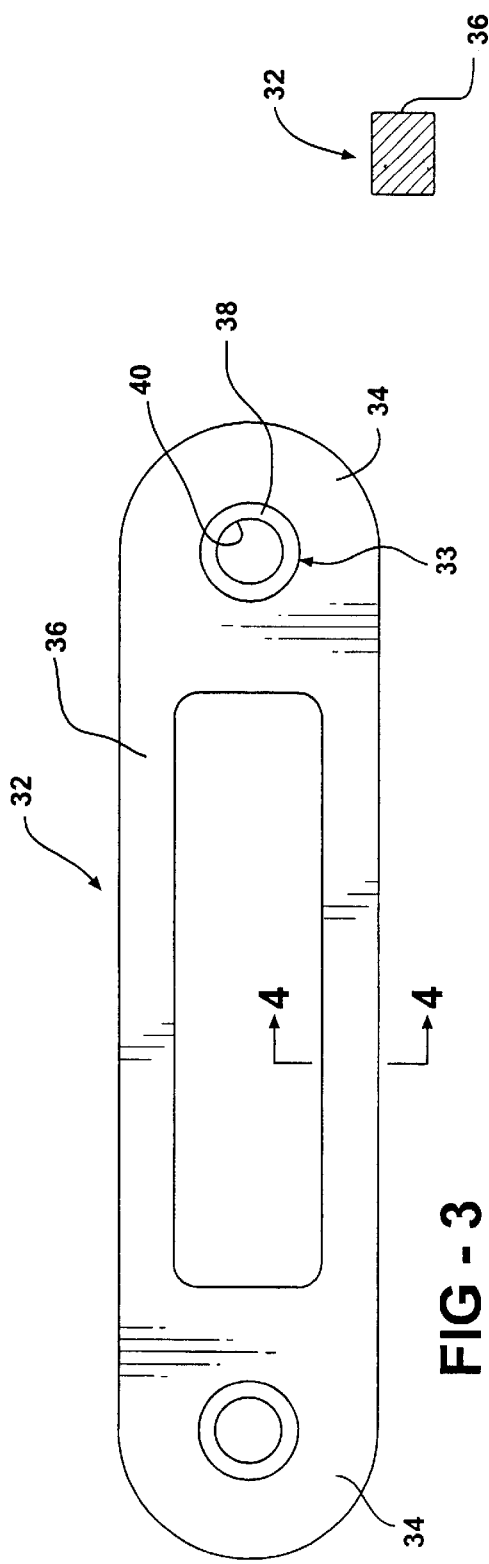
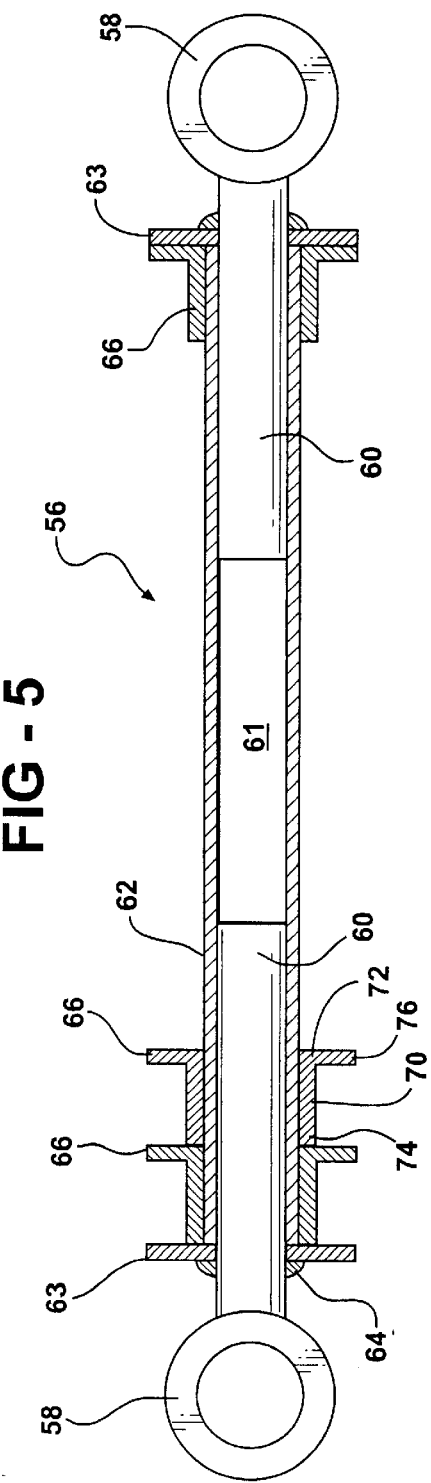

SPRING BAND FOR AN AXLE ASSEMBLY

BACKGROUND OF THE INVENTION

This invention relates to a self-steering auxiliary axle assembly for a tractor-trailer, and more specifically, to a spring band which may be adapted for use as a steering damper in a self-steering auxiliary axle assembly.

Auxiliary axle assemblies are used on tractor-trailers to reduce the load on each axle to conform to applicable highway laws. When using the additional auxiliary axle assemblies the trailer becomes more difficult to turn and tire wear increases. The length of the tractor-trailer coupled with the number of axles causes the wheels to drag or scrub during a turn. To minimize scrub and extend tire wear, auxiliary and non-auxiliary axle assemblies incorporate self-steering mechanisms. Self-steering mechanisms permit the wheels on the axle assemblies to turn a few degrees relative to the axle as the tractor-trailer turns. The self-steering mechanisms utilize steering dampers to maintain the wheels in a normally straight direction while permitting the wheels to turn slightly when the tractor-trailer turns. Further, the steering damper dampens wheel wobble when the axle assembly and wheels are in engagement with the road. Typically, shock absorber-type dampers are used, but these dampers are not well suited to steering damper applications and require high maintenance.

Therefore, what are needed is an improved steering damper that is effective and requires minimal maintenance.

SUMMARY OF THE INVENTION AND ADVANTAGES

The present invention provides and elastic member for use as a steering damper. A self-steering auxiliary axle assembly has a frame with an axle supported by the frame. The axle has opposing ends with spindle assemblies pivotally supported thereon for permitting rotation of said spindle assemblies relative to said axle. Steering arms extend from the spindle assemblies, and a control rod interconnects the steering arms for linking the spindle assemblies together. The steering damper interconnects one of the steering arms and the axle for damping the rotation of the spindle assemblies relative to the axle. The steering damper has opposing connections movable relative to one another with the opposing connections joined by the elastic member. Alternatively, a plurality of elastic members may be arranged adjacent to one another in abutting relationship between the opposing ends.

Accordingly, the above invention provides an improved steering damper that is effective and require minimal maintenance.

BRIEF DESCRIPTION OF THE DRAWINGS

Other advantages of the present invention can be understood by reference to the following detailed description when considered in connection with the accompanying drawings wherein:

FIG. 3 is an elevational view of a spring band of the present invention;

FIG. 4 is a cross-section of the spring band shown in FIG. 3 taken along line 4—4; and FIG. 5 is an alternative embodiment of a steering damper.

DETAILED DESCRIPTION OF THE PREFERRED EMBODIMENT

Figure 1:
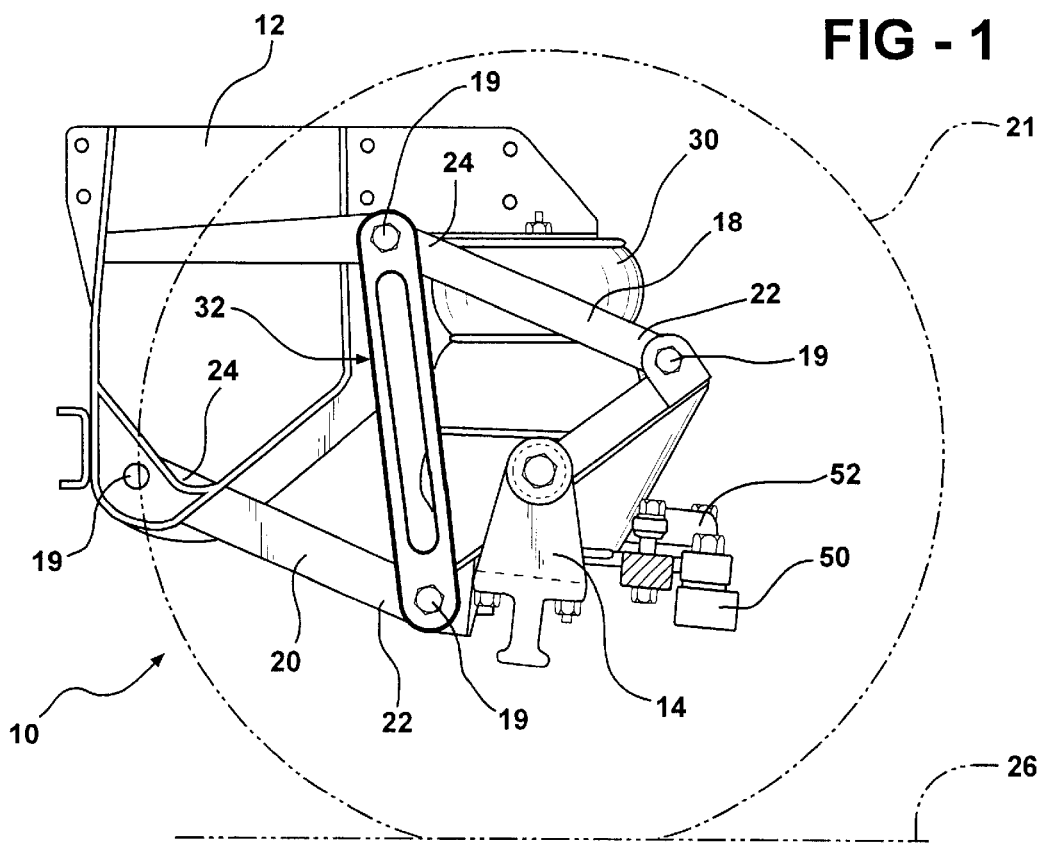
FIG. 1 is a side elevational view of a self-steering auxiliary axle assembly of the present invention.
Figure 2:
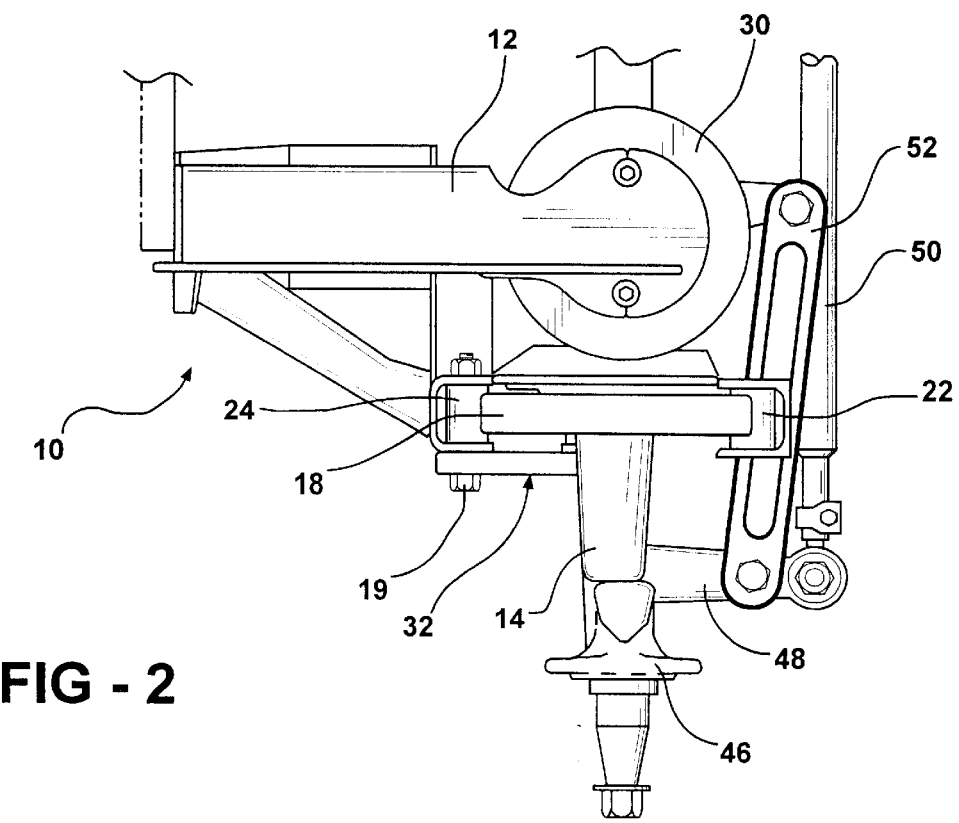
FIG. 2 is a top elevational view of the axle assembly shown in FIG. 1.

A self-steering auxiliary axle assembly 10 is shown in FIGS. 1 and 2. The assembly 10 has a suspension frame 12 secured to the lower portion of a tractor-trailer. The frame 12 may include any number of sub-assemblies fastened or welded together. An axle 14 is spaced apart from and pivotally attached to the frame 12 by upper 18 and lower 20 suspension arms on each side of the axle 14 (only one side is shown in the Figures). The suspension arms 18, 20 are secured to the frame by fasteners 19. Wheels 21 are supported on opposing ends of the axle 14. Each of the suspension arms 18, 20 have first 22 and second 24 opposing ends with the first ends 22 connected to the axle 14 and the second ends 24 connected to the frame 12. The axle 14 is movable between a retracted position in which the axle 14 is stowed and a highway position (shown in FIG. 1) in which the wheels 21 are in engagement with the roadway 26 to reduce the load on each trailer or truck axle.

At least one air spring 30, usually one on each side of the axle 14, is disposed between the axle 14 and the frame 12 for damping the movement of the axle 14 when the axle 14 is travelling along the roadway 26 in the highway position. The air springs 30 are actuateable between an operative mode in which the air spring 30 is inflated for damping the axle in the highway position (shown in FIG. 1) and a non-operative mode in which the air spring 30 is deflated when in the retracted position.

At least one elastic member 32 disposed between the axle 14 and the frame 12 for moving the axle 14 from the highway position to the retracted position when the air springs 30 are actuated, or deflated, from the operative mode to the non-operative mode. Preferably, at least one elastic member 32 interconnects the second end 24 of the upper suspension arm 18 and the first end 22 of the lower suspension arm 20. The elastic member 32 may be secured by the same fasteners 19 used to secure the suspension arms 18, 20. It is to be understood that the elastic member 32 may be arranged anywhere between the axle 14 and frame 12. Preferably, several elastic members 32 are arranged between the axle 14 and the frame 12.

Referring now to FIG. 3, the elastic member 32 has opposing connections 33 on opposing ends 34, which are movable relative to one another, that are interconnected by generally parallel legs 36. The opposing connections 33 are adapted to provide an attaching mechanism and may include a bushing 38 having a hole 40 for receiving fasteners. The legs 36 preferably have a rectangular cross-section, shown in FIG. 4. The elastic members 32 are constructed from a resilient material, such as polyurethane. The elastic member 32 are installed between the axle 14 and frame 12 in tension so that as the air springs 30 are deflated the elastic members 32 will pull the axle 14 from the highway position toward the frame 12 to the retracted position. The size and number of the elastic members 32 are designed to provide enough force to raise the axle 14. It is to be understood that the present invention steering damper, described below, may be used with any suitable lift mechanism.

Returning to FIG. 2, the axle 14 has spindle assemblies 46 pivotally supported on the opposing ends of the axle 14 for permitting rotation of the spindle assemblies 46 relative to the axle 14 when the trailer turns. Steering arms 48 extend from the spindle assemblies 46 and a control rod 50 interconnects the steering arms 48 for linking the spindle assemblies 46 together. According to the present invention, an elastic member 52, similar to the elastic member 32 described above, is used as a steering damper to interconnect one of the steering arms 48 and the axle 14 for damping the rotation of the spindle assemblies 46 relative to the axle 14 when the axle is in the highway position. An elastic member 52 may be used on both ends of the axle 14 if desired. The elastic member 52 is installed in tension between the axle 14 and steering arm 48 so it may apply force to the spindle assemblies 46 and maintains them, and the attached wheels 21, in a normally straight forward orientation.

An alternative steering damper 56 is shown in FIG. 5. The steering damper 56 has opposing connections 58 on opposing ends 60 that are movable relative to one another. The steering damper 56 has a tubular bearing member 62 with the opposing ends 60 disposed at least partially within the tubular bearing member 62. A cavity 61 is defined between the opposing ends 60 so that there is space for them to move relative to one another. Retainers 63 are secured to each opposing end 60 by a weld 64. A plurality of elastic members 66 are arranged on the tubular bearing member 62 along its length (only three are shown) adjacent one another and in abutting relationship between the retainers 63.

The elastic members 66 have a cylindrical body 70 with first 72 and second 74 ends. The first end 72 has an annular flange 76 extending from it. The elastic members 66 are arranged so that the flange 76 of one elastic member 66 abuts the second end 74 of another of the elastic members 66. Preferably the elastic members 66 are constructed from a resilient material, such as polyurethane. The steering damper 56 is installed between the axle 14 and the steering arm 48 in compression so that the elastic members 66 will bias the opposing end connections 58 away from one another. The steering damper 56 applies force to the spindle assemblies 46 and maintains them, and the attached wheels 21, in a normally straight forward orientation.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A self-steering axle assembly comprising:

a frame;

an axle supported by said frame and having opposing ends with spindle assemblies pivotally supported thereon for permitting rotation of said spindle assemblies relative to said axle;

steering arms extending from said spindle assemblies;

a control rod interconnecting said steering arms for linking said spindle assemblies together; and a steering damper interconnecting one of said steering arms and said axle for damping said rotation of said spindle assemblies relative to said axle, said steering damper having opposing connections on opposing ends movable relative to one another with a plurality of elastic members adjacent one another in abutting relationship interposed between said opposing ends.

2. The axle assembly as set forth in claim 1 wherein said steering damper further includes a tubular bearing member with said plurality of elastic members disposed thereon, and said opposing ends disposed at least partially within said tubular bearing member.

3. The axle assembly as set forth in claim 2 wherein each opposing end has a retainer secured thereto with said plurality of elastic members interposed between said retainers.

4. The axle assembly as set forth in claim 1 wherein said plurality of elastic members have a cylindrical body with first and second ends, said first end having an annular flange extending therefrom, said flange of one of said plurality of elastic members abutting said second end of another of said plurality of elastic members.

5. The axle assembly as set forth in claim 4 wherein said plurality of elastic members comprise polyurethane.

6. A self-steering axle assembly comprising:

a frame;

an axle supported by said frame and having opposing ends with spindle assemblies pivotally supported thereon for permitting rotation of said spindle assemblies relative to said axle;

steering arms extending from said spindle assemblies;

a control rod interconnecting said steering arms for linking said spindle assemblies together; and a steering damper interconnecting one of said steering arms and said axle for damping said rotation of said spindle assemblies relative to said axle, said steering damper having opposing connections movable relative to one another with said opposing connections joined by an elastic member.

7. The axle assembly as set forth in claim 6 wherein said elastic member includes opposing ends with said opposing connections, said opposing ends interconnected by generally parallel legs.

8. The axle assembly as set forth in claim 7 wherein said legs have a rectangular cross-section.

9. The axle assembly as set forth in claim 6 wherein said elastic member comprises polyurethane.

10. The axle assembly as set forth in claim 1 wherein said frame includes longitudinal and lateral directions, said axle is supported by said frame in said lateral direction, and said steering damper is arranged generally in said lateral direction.

11. The axle assembly as set forth in claim 6 wherein said frame includes longitudinal and lateral directions, said axle is supported by said frame in said lateral direction, and said steering damper is arranged generally in said lateral direction.

* * * * *